US012600191B2

(12) United States Patent
Hiddema

(10) Patent No.: US 12,600,191 B2
(45) Date of Patent: Apr. 14, 2026

(54) OFF-ROAD VEHICLE AND SUSPENSION FOR SUCH VEHICLE

(71) Applicant: AgXeed Holding B.V., Oirlo (NL)

(72) Inventor: Joris Jan Hiddema, Grubbenvorst (NL)

(73) Assignee: AgXeed Holding B.V., Oirlo (NL)

( * ) Notice: Subject to any disclaimer, the term of this patent is extended or adjusted under 35 U.S.C. 154(b) by 429 days.

(21) Appl. No.: 18/271,315

(22) PCT Filed: Jan. 6, 2022

(86) PCT No.: PCT/NL2022/050002
§ 371 (c)(1),
(2) Date: Jul. 7, 2023

(87) PCT Pub. No.: WO2022/149978
PCT Pub. Date: Jul. 14, 2022

(65) Prior Publication Data
US 2024/0300280 A1    Sep. 12, 2024

(30) Foreign Application Priority Data

Jan. 7, 2021    (NL) ..................................... 2027283

(51) Int. Cl.
B60G 21/073 (2006.01)
B62D 55/108 (2006.01)

(52) U.S. Cl.
CPC ......... B60G 21/073 (2013.01); B62D 55/108 (2013.01); *B60G 2204/421* (2013.01); *B60G 2300/082* (2013.01); *B60G 2300/32* (2013.01)

(58) Field of Classification Search
CPC .. B60G 5/02; B60G 21/073; B60G 2204/421; B60G 2300/082; B60G 2300/32; B62D 55/0842; B62D 55/108
See application file for complete search history.

(56) References Cited

U.S. PATENT DOCUMENTS

| | | | | |
|---|---|---|---|---|
| 5,340,205 A | * | 8/1994 | Nagorcka | ............ B62D 55/104 |
| | | | | 305/132 |
| 5,458,359 A | * | 10/1995 | Brandt | ..................... B60G 9/00 |
| | | | | 180/378 |
| 6,164,399 A | * | 12/2000 | Bays | ................... B62D 55/084 |
| | | | | 305/120 |

(Continued)

*Primary Examiner* — Zakaria Elahmadi
(74) *Attorney, Agent, or Firm* — Richard M. Goldberg

(57) ABSTRACT

An off-road vehicle includes a chassis, an engine connected to that chassis and at least two tracks for supporting the vehicle on a surface, the tracks including a first track adjacent a first lateral edge of the chassis, a second track adjacent a second lateral edge of the chassis the tracks each being part of a separate first and second track assembly, each track assembly including a subframe with multiple wheels positioned around its circumference to guide the corresponding track, the subframe connected to the chassis using first and second axles, each subframe hingeably connected to the chassis at the first axle and moveably connected to the chassis via a suspension system at the second axle to allow vertical movement of the subframe with respect to the chassis, the suspension system including a Watt's linkage, and the first and second track assemblies each have a separate Watt's linkage.

15 Claims, 2 Drawing Sheets

(56)　　　　　　References Cited

U.S. PATENT DOCUMENTS

Figure 1:
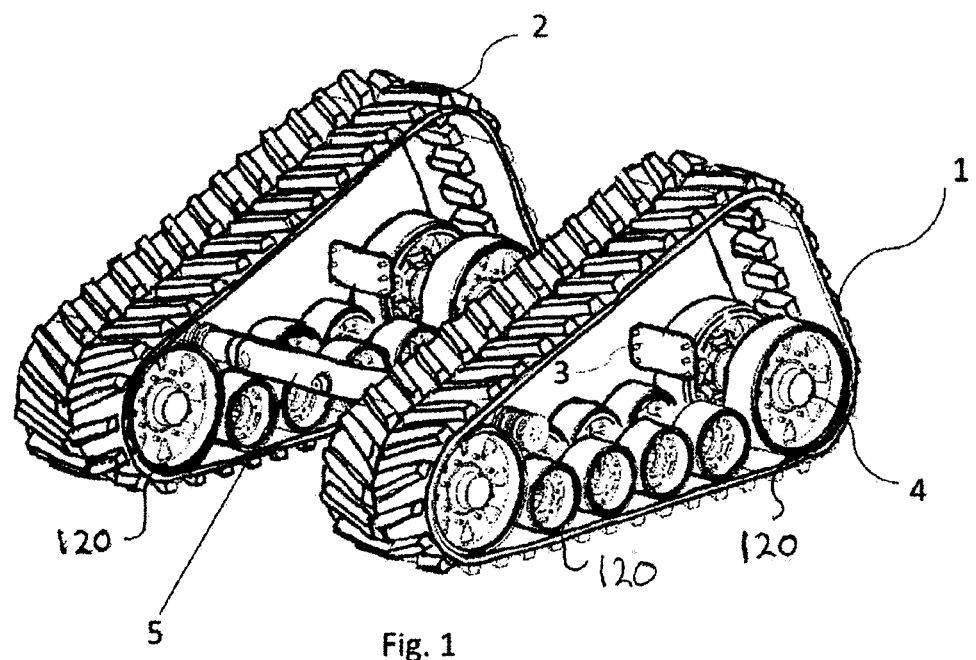

| | | | | |
|---|---|---|---|---|
| 6,401,847 | B1 * | 6/2002 | Lykken | B62D 55/30 |
| | | | | 180/9.1 |
| 6,810,975 | B2 * | 11/2004 | Nagorcka | B62D 55/084 |
| | | | | 280/124.156 |
| 7,229,094 | B2 * | 6/2007 | Miller | B60G 5/00 |
| | | | | 280/124.107 |
| 8,696,002 | B1 * | 4/2014 | Batdorff | B60G 9/00 |
| | | | | 280/5.509 |
| 9,457,850 | B2 | 10/2016 | Van Mill | |
| 10,144,460 | B2 * | 12/2018 | Hellholm | B62D 55/112 |
| 2004/0090048 | A1 | 5/2004 | Yoshida et al. | |
| 2004/0099451 | A1 * | 5/2004 | Nagorcka | B62D 55/0842 |
| | | | | 180/9.5 |
| 2011/0036650 | A1 * | 2/2011 | Simula | B62D 55/065 |
| | | | | 280/6.15 |
| 2013/0277125 | A1 * | 10/2013 | Moser | B60G 9/02 |
| | | | | 180/9.5 |
| 2019/0168559 | A1 * | 6/2019 | Brown | B60G 9/00 |

* cited by examiner

10

OFF-ROAD VEHICLE AND SUSPENSION FOR SUCH VEHICLE

GENERAL FIELD OF THE INVENTION

The present invention pertains in general to an off-road vehicle comprising a chassis and connected to that chassis an engine for propelling the vehicle, the vehicle further comprising at least two tracks for supporting the vehicle on a surface, the at least two tracks comprising a first track adjacent a first lateral edge of the chassis and opposite to the first track a second track adjacent a second lateral edge of the chassis opposite to the first lateral edge, wherein the first track and the second track are each part of a separate first and second track assembly respectively. The invention also pertains to a track assembly for connection to an off-road vehicle.

BACKGROUND ART

Horsepower and torque are often regarded the key factors in performance of off-road vehicles. However, all of the power generated by an engine is useless if the vehicle cannot be effectively controlled in order to follow a predetermined path over the land.

For an effective control at speeds above that of a wagon, a suspension system is indispensable. That is why vehicle engineers turned their attention to the suspension system almost as soon as they had mastered the commonly used four-stroke internal combustion engine.

The job of any vehicle suspension is to maximize the friction between the contact surfaces of the wheels (often the surface of a tyre) or any other revolving surface that supports the vehicle, and the land (i.e. the off road riding surface), to provide steering stability with good handling and to a lesser extent (more or less as a bonus effect) to ensure the comfort of the driver or any passengers. If a surface to be crossed road were perfectly flat, with no irregularities, suspensions wouldn't be necessary. But off-road surfaces are far from flat. All imperfections, no matter how small apply forces to the wheels. According to Newton's laws of motion, all forces have both magnitude and direction. A bump in the surface causes the wheel to move up and down perpendicular to the land to be crossed. The magnitude, of course, depends on whether the wheel is striking a giant bump or a tiny speck. Either way, the vehicle wheel experiences a vertical acceleration as it passes over an imperfection. Without an intervening structure, all of the wheel's vertical energy is transferred to the chassis of the vehicle, which moves in the same direction. In such a situation, the wheels can lose contact with the ground surface completely. Then, under the downward force of gravity, the wheels can slam back onto this surface which obviously is all disadvantageous for effective control of the vehicle. The suspension is a system that will absorb energy of the vertically accelerated wheel, aiming at the chassis (and all attached items) to ride undisturbed while the wheels follow imperfections of the land. A typical suspension contains a spring to absorb the energy of forces acting on the wheel. The two most common types of springs are coil springs and leaf springs. Both types absorb energy well, but they require shock absorbers to decrease or dampen their vibration after hitting a bump.

A further basic component of any off road vehicle suspension is the so-called linkage. The linkage is the assembly of bars and brackets that support the wheels, and optionally the springs and, if applicable, shock absorbers. There are a number of various shaped links that are used for the different types of suspension systems. They vary from straight bars to forged, cast or stamped metal shapes that best fit to support the wheels, springs and shock absorbers onto the chassis of the vehicle. The simplest linkage is a straight bar that connects one wheel to the other on the opposite side of the vehicle as applied for centuries on any vehicle. The type of linkage determines the type of suspension system, since the presence of a spring (or any other vertical energy absorber) and optionally a shock absorber is common for any suspension system. This way, the following types of suspensions are, or have been, commonly used on off-road vehicles:

Beam Axle Suspension

In the early days of automotive vehicles, a typical design was a rear drive set-up and a front axle of a solid beam design. It consisted solely of a fixed continuous member extending across the entire front end of the vehicle connecting the two steerable wheels. This is referred to as a "dependent" suspension system as the two wheels are mechanically linked together as opposed to an "independent" suspension system where the two wheels are not directly linked together. This system was used i.a. on the T-Ford, designed for off-road use in the vast rural areas of the USA.

Dual-Beam Suspension

Dual-beam front suspension is popular with U.S. manufacturers for light trucks. Dual beam suspensions are considered "independent" suspension systems as the two wheels are not directly connected as they are on the solid beam suspension discussed above. The major advantage of dual-beam suspension is that front shock loads from land imperfections are isolated to the side where they are encountered. This is opposed to one-piece front beam suspensions where shock loads encountered on one wheel are transported all the way across the vehicle causing excessive body shock loading.

Double Wishbone Suspension

The double wishbone suspension was first used in the 1930's in Europe Many vehicles used it until front wheel drive cars became popular. The double wishbone is classified as an independent suspension system that has been used to replace the beam type dependent suspension systems discussed here above. The double wishbone suspension system consists of two equal-sized short wishbone shaped members (arms) positioned one over the other. The closed ends of the two wishbone arms are hinge mounted to the top and bottom of the vehicle knuckle to provide vehicle steering. The vehicle knuckle supports the spindle or hub to which the wheel is mounted. The two open ends of each wishbone member are hinge-mounted to the vehicle frame. The wishbone suspension is lighter than the beam type suspension system but is far more costly. The double wishbone suspension differs between driven and non-driven wheels. The so called Short/Long Arm Suspension is a modification of the double wishbone suspension that can be used on both the driven and non-driven wheels of automotive vehicles.

MacPherson Strut Suspension

The Macpherson strut suspension is a lighter weight suspension system than a beam suspension and has about the same weight and cost as the short/long arm suspension disclosed above. Like the short/long arm suspension, it is classified as an independent suspension. The MacPherson strut suspension is like the short/long suspension except that the upper arm is rotated 90° up and outboard to a near vertical position, and replaced with a long member. This upper member, called the strut, contains a coaxial mounted spring and shock absorber with an anti-friction thrust bearing at the top. In a typical application, it is positively attached at the top to a chassis and also positively attached at the bottom to the knuckle. It is designed to support vertically applied suspension loads and rotates on the upper bearing with the wheel during vehicle steering. The design uses a similar lower wishbone shaped link to provide both lateral and longitudinal support for the wheel.

Twin-Traction Beam Suspension

Twin-traction beam (TTB), or twin I-beam, suspension was originally designed by Ford to combine the best of dependent and independent systems. A TTB system has two beams at the front of the vehicle. Each beam mounts on a pivot on one end, on the wheel on the other. The beams overlap quite a bit, so they act in essence like long control arms. A U-joint in the center allows for independent movement of both beams.

Any design has it pro's and con's, and is typically a compromise between optimum traction, comfort and weight (and therewith often costs and reliability). The more complex the linkage is, the better traction may be, but often at the cost of complexity and weight.

Object of the Invention

It is an object to provide an improved off-road vehicle, with a suspension system that allows maximum traction at a low weight, thus enabling optimum control while keeping complexity lows and reliability high. A secondary object is to provide track assembly with a suspension system that allows vehicles to be built with more degrees of freedom due to versatility of the suspension system.

SUMMARY OF THE INVENTION

In order to meet the object of the invention an off-road vehicle as introduced here above in the "General field of the invention" section was devised, thus comprising a chassis and connected to that chassis an engine for propelling the vehicle and at least two tracks for supporting the vehicle on a surface (and inherently extending parallel to the direction of movement of the vehicle), the at least two tracks comprising a first track adjacent a first lateral edge of the chassis and opposite to the first track a second track adjacent a second lateral edge of the chassis opposite to the first lateral edge, wherein the first track and the second track are each part of a separate first and second track assembly, each of the separate first and second assemblies comprising a subframe with multiple wheels positioned around its circumference to guide the corresponding track, the subframe being connected to the chassis using a first and second axle that extend from the subframe to the chassis, each subframe being hingeably connected to the chassis at the first axle and moveably connected to the chassis via a suspension system at the second axle to allow a vertical movement of the subframe with respect to the chassis, wherein the suspension system comprises a Watt's linkage, and wherein the first track assembly has a first Watt's linkage and the second track assembly has a separate second Watt's linkage.

Thus, according to the invention the vehicle has two separate track assemblies, and each of these comprising their own subframe, extending parallel to the tracks, devised for guiding these tracks on wheels that are positioned around the circumference of each track. Each subframe is connected to the chassis via two axles, that are separated in a direction parallel to the direction of movement, thus one axle being positioned adjacent the downstream (trailing) end of the vehicle, and the other being positioned adjacent the upstream (front) end of the vehicle. This construction as such is not uncommon in the art and provides a stable connection between a subframe that extends parallel to the vehicle and the chassis of this vehicle. However, since each of the subframes has to be movable with respect to the chassis to make sure there is a good connection with the (rough) surface when being propelled, heavy beams and complaint rubber block are typically used to absorb tension. This tension typically arises despite the fact that at the downstream axle there is a mere rotation of the subframe with respect to the chassis. However, at the upstream axle a suspension is provided which inherently leads to horizontal movements of the subframe when making large up and down movements. In the present invention, such horizontal movements are largely prevented by applying the Watt's linkage. This means that at the second axle there is a decreased risk of introducing high tension, which means that the construction may be less heavy while maintaining reliability and allowing maximum traction and steering control. The latter is in particularly important for autonomous vehicles which do not have an on-board operator that can immediately respond to deviations of an intended routing.

The Watt's linkage system is a relatively old linkage system, originally designed to be used on wagons pulled by one or more horses, to meet certain off-road qualities which was needed in those days of lack of decent road pavement. It has typically been applied to connect two opposing wheels to a chassis and is intended to prevent relative sideways motion between the wheel(s) and chassis of the vehicle. It is a rather heavy and expensive system, nowadays hardly applied anymore. However, it was applicant's recognition that in order to meet the object of the invention the Watt's linkage system may be advantageously applied to achieve optimum traction while keeping the weight relatively low, under the prerequisite that each of the opposing track assemblies has its own dedicated linkage to connect the respective assemblies to the chassis. By having each track assembly connected with its own linkage, the bars and other components can be made less heavy when compared with the common Watt's linkage system wherein two opposing wheels have to be connected in one linkage system. This contributes to the goal of reducing weight. However, this goal is further met due to the fact that because of the independent connection, the chassis may be less rigid which further contributes to weight saving. The secondary object of providing a suspension that allows vehicles to be built with more degrees of freedom is met since the linkage no longer needs to be an integral part of the vehicle (rolling) chassis. When applied as usual, each vehicle has a chassis with integrated Watt's linkage in which the length of the bars etc. correspond exactly to the vehicle width. Each chassis of a particular size thus requires a dedicated Watt's linkage system. When applying the present invention, the linkage can be integrated in a track assembly to be connected to a vehicle chassis of any width, while maintaining almost perfect suspension of each of the tracks, at a low weight. Ultimately, this is advantageous for production costs as well.

It is noted that in the present invention, it is the subframe of the track assembly that is connected in suspension to the chassis. The wheels that guide the track do not need any further suspension with respect to the subframe and hence the chassis.

The invention is also embodied in a track assembly for connection to an off-road vehicle, the track assembly comprising a track and a subframe with multiple wheels positioned around its circumference to guide this track, the subframe having two sites for operative connection to a chassis, a downstream site where the subframe is hingeably connectable to the chassis, and an upstream site comprising a Watt's linkage having a middle bar and two opposing end bars hingeably connected thereto, the middle bar being rigidly connected to the subframe and the two opposing end bars each having a connection means at their respective distal ends for connecting the Watt's linkage the chassis of the off-road vehicle, which thus allows a vertical movement of the subframe with respect to the chassis. This is advantageous for using the track assembly as a separate assembly to be mounted to just any off-road vehicle chassis, in particular a chassis of any width.

Definitions

The chassis of a vehicle is the load-bearing framework of the vehicle, which structurally supports the vehicle in its construction and function. The chassis of a vehicle is also referred to as the frame, i.e. the underpart of the vehicle, on which the body is mounted, as well as the engine, it's wheels and transmission. The frame plus wheels are also referred to as rolling chassis.

A track (also indicated as continuous track) is an endless belt that revolves around one or more wheels and is fixed below a vehicle to enable it to move easily over the ground. A track can be a linked metal chain such as often applied on tanks or heavy agricultural vehicles, or for example a rubber (typically metal wire reinforced) belt as used on most caterpillars.

An off-road vehicle is considered to be any type of vehicle which is capable of driving on and off paved or gravel surface to enable cross-country travel on or immediately over land, water, sand, snow, ice, marsh, swampland, or other natural terrain or rough ground such as agricultural land, forest grounds, dunes, heather, steppe, etc. Typical examples of off-road vehicles are tanks, tractors, SUV's like Range Rovers, Jeep's, Mahindra's, Honker's, Hummer's etc., some pick-up trucks, Unimog's, (Marsh) buggies etc.

Two parts being hingeably connected means that one part can rotate with respect to the other.

Two parts being moveably connected means that one part can move with respect to the other via translation.

A suspension of a vehicle is the system of springs, shock absorbers and linkages that connect the chassis of the vehicle to its supporting tracks and allows relative motion between the two.

A Watt's linkage is a type of mechanical linkage invented by James Watt in which the central moving point of the linkage is constrained to travel on a nearly straight line (a so called Watt's curve, a lemniscate or figure eight shaped curve). It was described in Watt's patent specification of 1784 for the Watt steam engine (British Patent 1432 Apr. 28, 1784). Watt's linkage typically consists of three bars, bolted together, in a chain. In this linkage the chain of bars consists of two end bars and a middle bar. The middle bar is connected at each of its ends to one of the ends of each outer bar. The two outer bars are of equal length, and are longer than the middle bar. The three bars can pivot around the two connections (typically bolts). The outer endpoints of the long bars are fixed in place relative to each other, but otherwise the three bars are free to pivot around the two joints where they meet. The Wat's linkage is intended to prevent relative sideways motion between the wheel(s) and chassis of the vehicle.

A first construction is identical to a second one if all components of the first construction are congruent to the components of the second construction and are arranged according to the same spatial configuration, notwithstanding that the first construction can be a mirror image of the second construction.

A damper is a devices for absorbing the energy of sudden impulses or shocks in machinery or structures. A damper is also referred to as a shock absorber.

A hydraulic line is a line whose operation is analogous to that of an electric wire except that electric currents are replaced by currents of water or other fluids that may move under pressure, as in a hydraulic control.

A tractor is an agricultural vehicle that is used to pull agricultural machinery and to provide the energy needed for the machinery to cultivate land (including any harvesting action). It commonly but not necessarily is a powerful vehicle with a gasoline, diesel or electric engine.

An autonomous tractor is a tractor that can automatically perceive its environment, make decisions based on what it perceives and recognizes and then actuate a movement or manipulation within that environment. These decision-based actions include but are not limited to starting, stopping, and maneuvering around obstacles that are in its way. Such a tractor can cross farmland without needing continuous control of a human operator, and when an agricultural machine is operatively connected to the tractor, it can autonomously cultivate the land.

A footprint of an object is the extent of physical dimensions that an object occupies in a particular direction, typically in horizontal direction (the footprint then being the space the object occupies when viewed from above).

An axis is an assembly representing an imaginary straight line passing through the center of a solid, about which a figure can be conceived as rotating to generate the solid. In practice, an axle (i.e. a rod, spindle, bar, shaft or assembly acting as such) is the item passing through the center of the solid, which solid may for example be an agricultural machine such as a plough.

A line is a path or guide that extends between a first and second location.

A road is a long narrow stretch with a smoothed or paved hard surface, made for travelling by a motor vehicle, carriage etc. between two or more points. A road is also referred to as a street, or (high) way.

Farmland is land that is used for or suitable for farming.

Automatically means without the need of (human) operator intervention. Automatically does not exclude that something is operator initiated or stopped as long the process can be completed without needing operator intervention.

A central processing unit or CPU is an electronic circuitry within a computer system that carries out the instructions of a computer program by performing the basic arithmetic, logic, controlling and input/output (I/O) operations specified by the instructions. The term "CPU" may refer to a tangible (single) processor, more specifically to its processing unit and control unit (CU), but may also refer to multiple processors distributed over a networked system operating as if part of one single processor.

FURTHER EMBODIMENTS OF THE INVENTION

The off-road vehicle of the invention is further embodied in a vehicle wherein the engine (which could be any engine such a combustion engine, electric engine, steam engine etc) is coupled to the first and second track assembly for transmitting its power to propel the vehicle over the surface. It appeared that the instant invention is particularly suited for the driven tracks of an off-road vehicle. As is commonly known, the suspension of the driven tracks f an off-road vehicle isn't the same as the suspension for any non-driven tracks (usually at the back of the vehicle). Apart from the traction forces that need to be delivered to the ground surface, since the driven tracks are typically the front tracks, the corresponding suspension has to absorb more braking torque. Also, these tracks are typically designed to turn right and left. Accordingly, suspensions of driven tracks tend to be more complex. In practice the front suspension systems of typical off-road vehicles most often feature a solid axle with leaf springs. Such a suspension is called a dependent system because the wheels are connected laterally so that they move together as a unit. Leaf springs attach to the frame of the vehicle and then, via U-bolts, to the axle housing. A sway bar mounted to each side of the axle controls body roll. This is a heavy complex assembly and still a compromise between control of the vehicle and comfort. In contrast, the system of the invention appears to be ideally suitable for the driven tracks of an off-road vehicle, but can equally be applied to any non-driven tracks or wheels. Given the lack of complexity, standard sizes and lack of need for different linkages for different tracks and/or wheels, this may contribute significantly to reduction of production costs while at the same time meeting the highest standards in suspension requirements.

In yet a further embodiment each track assembly of the vehicle is coupled to the chassis via a separate Watt's linkage. This further reduces complexity and adds to the suspension requirements of the vehicle.

In again a further embodiment, all Watt's linkages of the vehicle are of an identical construction for the same reason as indicated here above.

The current invention is highly suitable for application in a suspension system for so-called tracks, also denoted as continuous tracks or track wheels, as can be found on various off-road vehicles such as Caterpillar tractors and machinery, some military vehicle as well as on some agricultural vehicles and even people carriers for particular surface such as ice and dessert land. Typically, continuous tracks are unsprung. That is why there is a constant desire to reduce the weight of the tracks improving suspension performance at speeds where the track's momentum is significant. This however leads to a compromise between control, performance and reliability/durability. Applicant found that the complete track assembly, can be suspended with respect to the chassis, linking each of the track assembles to the chassis via the Watt's linkage. This greatly improves suspension of the continuous track with respect to the chassis and thus leaves far more freedom of design for the track assembly itself. In a further embodiment the first track assembly is identical to the second track assembly. This reduces complexity of the vehicle and thus production costs. In still a further embodiment the Watt linkage of each track is incorporated within the footprint of each track.

In yet again a further embodiment the first Watt linkage of the first track assembly is operatively connected to a first damper to restrict the vertical movement of the subframe of the first track assembly with respect to the chassis. A damper appears to be advantageous also when combined with the novel type of suspension. Preferably, the second Watt linkage of the second track assembly is operatively connected to a second damper to restrict the vertical movement of the subframe of the second track assembly with respect to the chassis. More preferably the first damper and the second damper are operatively connected to induce an opposite (vertical) movement in the subframe of the first track assembly with respect to the subframe of the second track assembly. The first damper and the second damper may for example be connected through a hydraulic line. This way, the movement of the two opposing track assemblies can be operatively connected, as is the case when using a solid beam or axle, but without using such a beam or axle. The disadvantage of a beam or axle is that its dimensions have to correspond exactly to the dimension to the chassis, so leaving little degree of freedom in design, in particular when foreseeing that various vehicle having different types of chassis are being manufactured. This problem does not exist when using a hydraulic line for the operative connection between the two dampers. The line can be easily adjusted to any type of chassis width. Another advantage of a hydraulic line is that the level of connection can be controlled, if desired. With a solid beam or axle, there is no other option than that the second wheel has exactly the same vertical movement length as the first wheel (but in opposing direction). When using a hydraulic line, the level of movement can in principle be controlled.

The present invention can be advantageously applied in any off-road vehicle that is an autonomous tractor having two track assemblies, the first and second assembly each comprising a continuous track, and which assembly hinges with respect to the chassis around an axle situated at the downstream end (i.e. the trailing end) of the tractor. This set-up appears to be ideally suitable for an autonomous tractor that can cultivate any piece of land, without a driver being present on the vehicle itself. Autonomous tractors employ much the same approach as the driverless vehicles, i.e. using advanced control systems and sensors. With the inclusion of auto-steering abilities, such tractors have added control abilities. Evidently, the launch of the autonomous tractors is considerably a manifestation of the extended use of technology in farming, but is also depend on the quality of the work performed, with evidently depends i.a. on the precise control of the vehicles propulsion over the land and thus, on the suspension of the vehicle.

Benefits to farmers of an autonomous vehicle are obvious. It is an undeniable fact that farming is not an easy undertaking, it involves working for long hours and the subscription to hard labor in harsh weather conditions. Taking into consideration the common state of farmers, the majority of them have no employees to task them in the farmland and hence, have to do everything all by themselves. The autonomous tractors can be a positive outcome. Next to this, accuracy and precision are important aspects in agriculture in various aspects such as planting. Regarding for example such planting, the autonomous tractors can be equipped with automatic planting systems that ensure high accuracy when planting. With such abilities, farmers are assured of seed conservation. All in all, the use of such tractors may lead to higher return on investment since accuracy is enhanced.

One of the factors that hinder agricultural production in both developed and developing countries is the lack of enough labor. Normally, farmers grow a small section of land which they are sure to manage with their limited labor. However, with the adoption of the autonomous tractors, the problem of labor insufficiency is catered for since the number of employees needed to cultivate the farmland may be reduced.

Also data plays a significant role in determining the farmers' decisions. Usually, the absence of clear and reliable data can interfere with the decisions farmers make, and subsequently, have adverse impacts on the amount of outcome obtained from the fields. There are diverse sources and types of data that a farmer needs to succeed in their farming activities. For example, data on soil is important in that it helps farmers in determining what crops will do well in a given piece of land by establishing the moisture content, and the amount of nutrients. The autonomous tractors can be fitted with various sensors that can be used in the collection of data on the conditions of the soil, and hence, offer a platform for improving the outcome of the available crops. The elimination of the human interaction in farming following the use of autonomous tractors may thus be advantageous. Stressed employees cannot achieve the required efficiency level in the fields. Similarly, it is often hard for humans to manage diverse tasks on the farm especially where a large farmland is involved. Autonomous tractors have the appropriate sensors to offer the necessary help in the management of a several tasks in the farmland hence reducing stress and the workload in the farm.

The autonomous tractors run on high level technology that can be used in gathering high profile information. For example, some models have automatic steering abilities and GPS technologies which enhance the control of the tractors' course. The advanced sensors come in handy in the determination of soil moisture level, activities around planting and harvesting, present yield, as well as the amount of fuel needed for a given area of land. Additionally, other models of autonomous tractors can guide farmers on how to apply fertilizers.

Autonomous tractors allow precise control of work and farm equipment. This makes it possible for farmers to extend their working hours. The sensors fitted in the tractors can guide it in the right course even in conditions of reduced visibility and at night: work continues even during windy, dusty, and foggy conditions. Additionally, the ability of the tractors to reduce workload and stress on employees comes in handy in increased working hours in a day since the farmer has a greater flexibility in the management of growing tasks.

Evidently, autonomous tractors can greatly improve farming, i.e. when the vehicle's propulsion can be controlled precisely even when lacking a dedicate driver on the vehicle itself. When using the present invention this can be achieved. In an embodiment, each continuous tack comprises two operatively connected, laterally arranged, separate sub-tracks. This resembles the dual-wheel approach as often used on agricultural vehicles. Preferably the sub-tracks are identical.

The invention will now be further explained using the following examples.

EXAMPLES

FIG. 1 schematically depicts the track assembly and essential parts of the suspension linkage of a prior art off-road vehicle.

Figure 2:
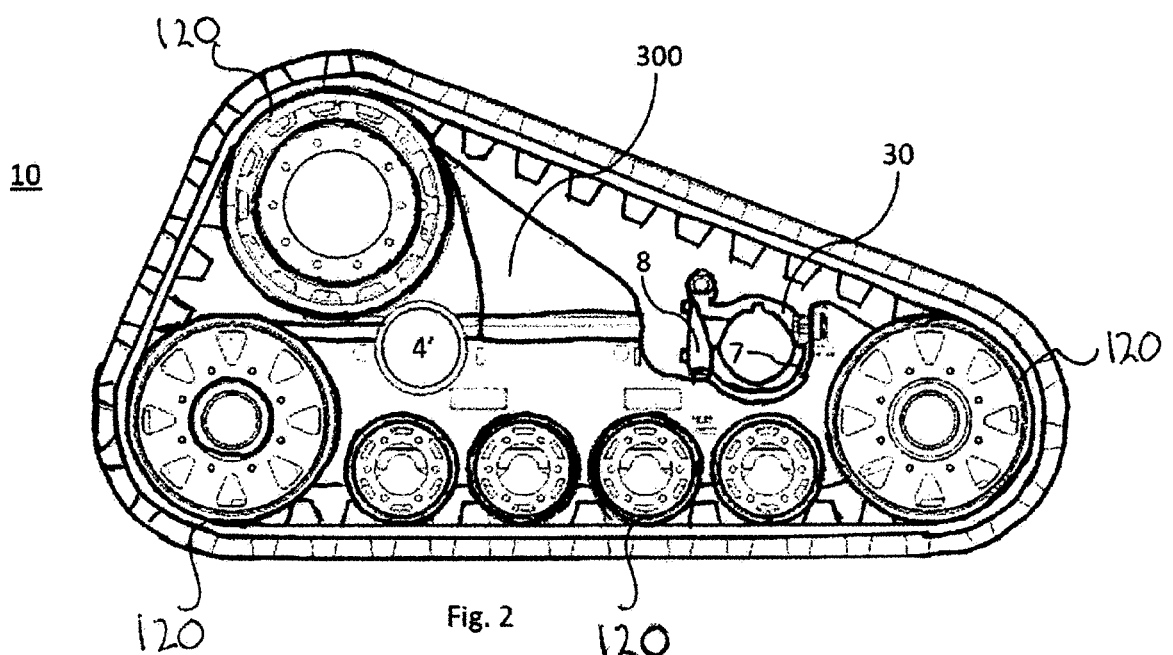

FIG. 2 schematically depicts a track assembly for use according to the present invention.

Figure 3:
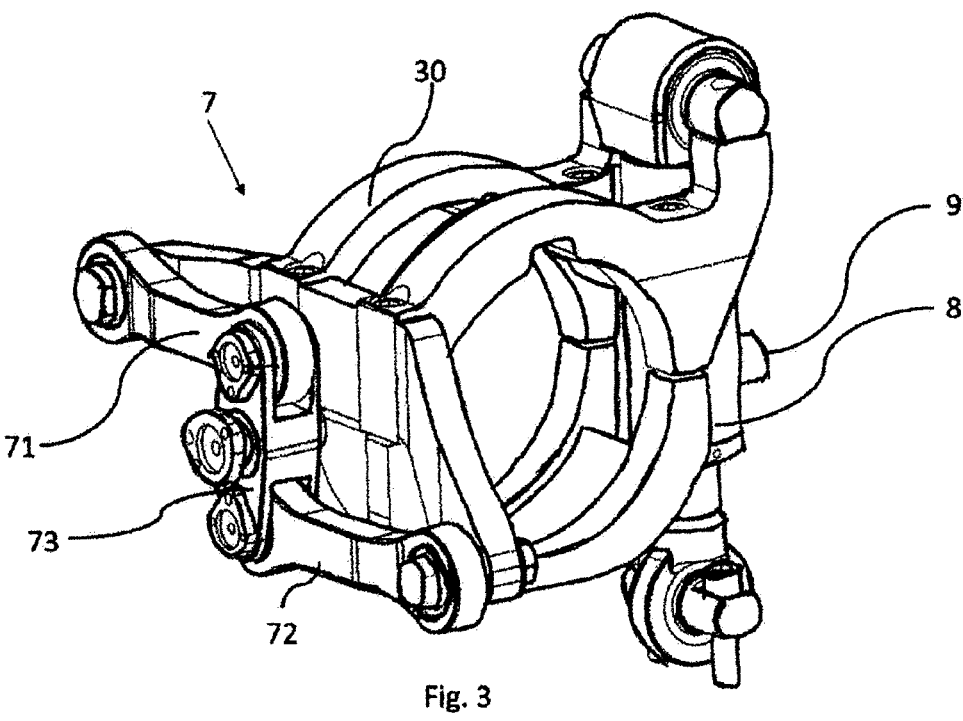

FIG. 3 schematically depicts the essential parts of the suspension system for use in the present invention.

Figure 4:
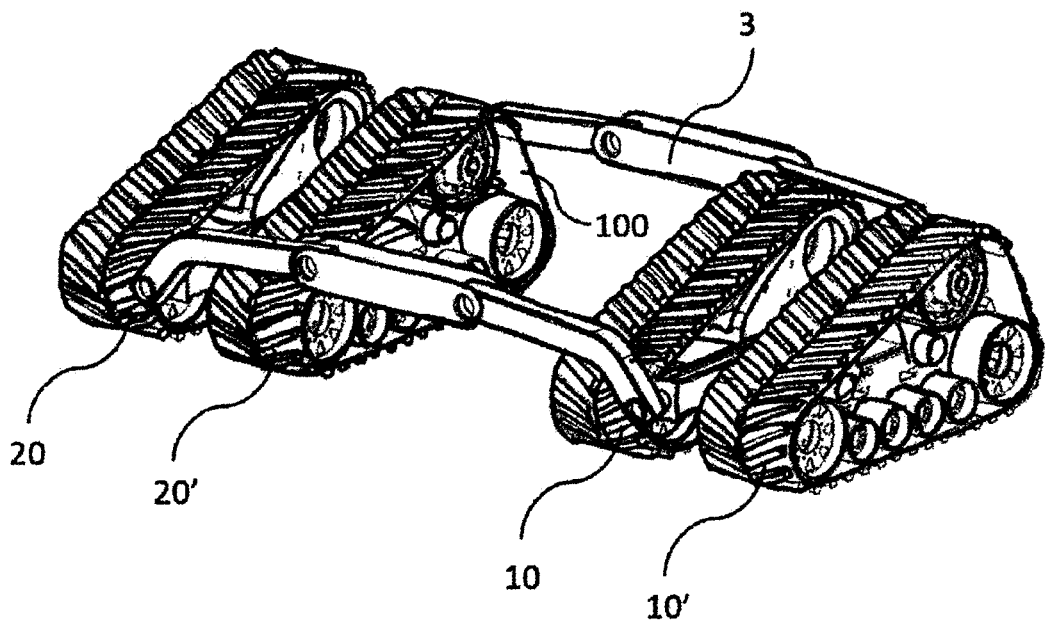

FIG. 4 schematically depicts essential parts of an embodiment of a vehicle according to the invention.

FIG. 1

FIG. 1 schematically depicts the track assembly and other essential parts of the suspension linkage of a prior art off-road vehicle. The non-shown parts include i.a. the entire chassis, engine and gearbox and body including cabin as commonly known for any off-road vehicle. In this example the vehicle is an agricultural tractor comprising two continuous tracks, track 1 and track 2, situated on opposing lateral edges of the chassis. The tracks are hingeably connected to the chassis (a connection member of which chassis is indicated with reference number 3) via a hitch axle 4 situated at the downstream (trailing) end of the tractor, that fits a subframe of the track assembly. This subframe (as such not depicted in FIG. 1; see FIG. 2 for such a subframe), which runs parallel to the direction of movement of the vehicle, is used to carry the wheels 120 that are provided around the circumference of the subframe and which guide the tracks, and also used for providing the operative connection between the track assembly and the chassis of the vehicle. Each of the two subframes of each track assembly is coupled to the chassis via a commonly used suspension system, including a swing axle 5 for linking the tracks to the chassis. The spring and damper are not depicted but arranged as commonly known in conjunction with the swing axle 5. As is commonly known, the vertical movements of the tracks also involves an inherent horizontal movement due to the construction with a swing axle. The horizontal movement causes tension at the hinge points. For this reason compliant connection parts (such as rubber blocks) are present to allow the horizontal movement and to prevent that the tension causes rigid parts to fail.

FIG. 2

FIG. 2 schematically depicts a track assembly 10 for use according to the present invention, in this case comprising a continuous track corresponding to track 1 as used in the vehicle of FIG. 1, differing in principle only in the used suspension system, in particular the linkage system between the subframe of the track assembly and the chassis.

The space where the track 10 is attached around the hitch axle (not shown in itself) is indicated with 4', which is a whole in the subframe 300 of track assembly 10 adjacent its downstream end. Track assembly sub-frame 300 snuggly fits around the hitch axle. A second connection between the chassis (not indicated in FIG. 2) and the track 10 is via a beam of the chassis that is grasped by enclosure 30 at the upstream (front) end of the tractor. This enclosure 30 is thus rigidly connected to the chassis. At the front of this enclosure a Watt's linkage system 7 (depicted in greater detail in FIG. 3) is provided that links the enclosure, and thus the chassis, to track assembly, i.e. to sub-frame 300 of this assembly. At the back side of enclosure 30 a hydraulic damper 8 including a coil spring for shock absorption is positioned. This damper restricts the free movement of sub-frame 300 with respect to the chassis. By having the Watt's linkage system, the track 10 in essence is only able to move in a vertical direction, preventing substantial horizontal movements. This way no extra stress and tension arises at the hinges. Also, the system is easy to adjust and allows use on chassis with a variable track width since all components of the suspension are contained within the track (assembly), even within the footprint of this track 10. In fact the track 10 is a self-supporting track assembly, for connection to any off-road vehicle. Another important feature of this embodiment is that the two opposing end bars extend in a direction transverse to the moving direction (i.e. they extend from the subframe). This way, when the vehicle takes a curve, lateral forces can be absorbed readily by the bars of the Watt's linkage as well as the downstream axle. In case the Watt's linkage would have been arranged such that it extends in the direction of movement, (almost) all lateral forces would have to be absorbed at the downstream axle that thus would have to be of a very heavy construction. It is noted that even though the Watt's linkage systems of both track assemblies are separate, each of the axles that run through holes 30 and 4' respectively may be of unitary construction (such that both of the subframes are connected to the same axles).

FIG. 3

FIG. 3 schematically depicts the essential parts of the suspension system for use in the present invention, including the linkage system of the present invention. With this system a self-supporting track assembly can be made for connection to an off-road vehicle of any width.

Depicted are the connection enclosure 30, Watt's linkage 7 and damper 8. This damper is operatively connected via a hydraulic line (not shown) for which connector 9 is shown, to the damper of the opposing track (not shown). Both dampers are operatively connected to induce an opposite vertical movement in the other track when a first track is forced to move with respect to the chassis due to an imperfection in the land. The Watt's linkage comprises two opposing end bars 71 and 72, as well as a middle bar 73, all positioned within the footprint of the track as indicated before. The set-up is analogous to the use of Watt's linkage for connecting two opposing wheels to a chassis, expect that in this case both of the opposing end bars 71 and 72 are hingeably connected to the chassis (by bolting to enclosure 30, allowing a rotation of the end bars with respect to the enclosure 30, and the middle bar is connected to the track, i.e. to track sub-frame 300.

FIG. 4

FIG. 4 schematically depicts essential parts of an embodiment of a vehicle according to the invention, in this case an autonomous agricultural vehicle for cultivating very loose (non-dense) farmland. Depicted are chassis 3, a space 100 for positioning the engine and dual tracks 10/10' and 20/20'. Each of the tracks is identical in construction and holds within its footprint a suspension system according to the invention.

The invention claimed is:

1. An off-road vehicle of the type including a chassis and an engine connected to the chassis for propelling the vehicle, the vehicle comprising:

at least two tracks for supporting the vehicle on a surface, the at least two tracks comprising a first track adjacent a first lateral edge of the chassis and a second track opposite to the first track and adjacent a second lateral edge of the chassis opposite to the first lateral edge, wherein the first track and the second track are each part of a separate first track assembly and second track assembly, each of the separate first and second track assemblies comprising:

a subframe with multiple wheels positioned around a circumference thereof to guide the corresponding track, a first axle and a second axle that extend from the subframe to the chassis for connecting the subframe to the chassis, each subframe being hingeably connected to the chassis at the first axle, a suspension system which moveably connects each subframe to the chassis at the second axle to allow a vertical movement of the subframe with respect to the chassis, the suspension system comprising a Watt's linkage, and the first track assembly has a first Watt's linkage and the second track assembly has a separate second Watt's linkage.

2. An off-road vehicle according to claim 1, wherein each Watt's linkage comprises a middle bar and two opposing end bars and the vehicle has a moving direction that is parallel to the direction in which the tracks extend, wherein the two opposing end bars extend in a direction transverse to the moving direction.

3. An off-road vehicle according to claim 1, wherein the engine is coupled to the first track assembly and the second track assembly for transmitting power to propel the vehicle over the surface.

4. An off-road vehicle according to claim 1, wherein all Watt's linkages of the vehicle are of an identical construction.

5. An off-road vehicle according to claim 1, wherein the first track is identical to the second track.

6. An off-road vehicle according to claim 1, wherein the Watt's linkage of each track assembly is incorporated within the footprint of each track assembly.

7. An off-road vehicle according to claim 1, wherein the first Watt's linkage of the first track assembly is operatively connected to a first damper to restrict vertical movement of the subframe of the first track assembly with respect to the chassis.

8. An off-road vehicle of the type including a chassis and an engine connected to the chassis for propelling the vehicle, the vehicle comprising:

at least two tracks for supporting the vehicle on a surface, the at least two tracks comprising a first track adjacent a first lateral edge of the chassis and a second track opposite to the first track and adjacent a second lateral edge of the chassis opposite to the first lateral edge, wherein the first track and the second track are each part of a separate first track assembly and second track assembly, each of the separate first and second track assemblies comprising:

a subframe with multiple wheels positioned around a circumference thereof to guide the corresponding track, a first axle and a second axle that extend from the subframe to the chassis for connecting the subframe to the chassis, each subframe being hingeably connected to the chassis at the first axle, a suspension system which moveably connects each subframe to the chassis at the second axle to allow a vertical movement of the subframe with respect to the chassis, the suspension system comprising a Watt's linkage, the first track assembly has a first Watt's linkage and the second track assembly has a separate second Watt's linkage, wherein the first Watt's linkage of the first track assembly is operatively connected to a first damper to restrict vertical movement of the subframe of the first track assembly with respect to the chassis, and wherein the second Watt's linkage of the second track assembly is operatively connected to a second damper to restrict the vertical movement of the subframe of the second track assembly with respect to the chassis.

9. An off-road vehicle according to claim 8, wherein the first damper and the second damper are operatively connected to induce an opposite movement in the subframe of the first track assembly with respect to the subframe of the second track assembly.

10. An off-road vehicle according to claim 9, wherein the first damper and the second damper are connected through a hydraulic line.

11. An off-road vehicle according to claim 1, wherein each track assembly comprises two operatively connected, laterally arranged, separate sub-tracks.

12. An off-road vehicle according to claim 11, wherein the sub-tracks are identical.

13. A track assembly for connection to an off-road vehicle, the track assembly comprising:

a track and a subframe with multiple wheels positioned around a circumference thereof to guide the track, the subframe having two sites for operative connection to a chassis, the two sites including:

a downstream site where the subframe is hingeably connectable to the chassis, and an upstream site comprising a Watt's linkage having a middle bar and two opposing end bars hingeably connected thereto, the middle bar being rigidly connected to the subframe and the two opposing end bars each having a connection at respective distal ends thereof for connecting the Watt's linkage to the chassis of the off-road vehicle.

14. A track assembly according to claim 13, wherein the middle bar and the two opposing end bars are positioned within the footprint of the track assembly.

15. A track assembly according to claim 13, wherein the two opposing end bars extend in a direction transverse to the subframe.

\* \* \* \* \*